United States Patent
Cho et al.

(10) Patent No.: US 8,253,369 B2
(45) Date of Patent: Aug. 28, 2012

(54) SINGLE PHASE INDUCTION MOTOR

(75) Inventors: SeongKook Cho, Changwon-si (KR);
Byung-Taek Kim, Gunsan-si (KR);
Kyeong-Ho Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 448 days.

(21) Appl. No.: 12/450,878

(22) PCT Filed: Jun. 9, 2009

(86) PCT No.: PCT/KR2009/003081
§ 371 (c)(1),
(2), (4) Date: Oct. 16, 2009

(87) PCT Pub. No.: WO2010/058885
PCT Pub. Date: May 27, 2010

(65) Prior Publication Data
US 2011/0025254 A1    Feb. 3, 2011

(30) Foreign Application Priority Data

Nov. 24, 2008    (KR) .......................... 10-2008-011710

(51) Int. Cl.
*H02P 1/26*    (2006.01)
(52) U.S. Cl. ......... 318/781; 318/751; 318/774; 318/788
(58) Field of Classification Search .................. 318/727, 318/749, 751, 774, 778, 781, 788, 792
See application file for complete search history.

(56) References Cited

U.S. PATENT DOCUMENTS

| | | | | |
|---|---|---|---|---|
| 5,212,436 A * | 5/1993 | Nacewicz et al. | ............. | 318/788 |
| 5,451,853 A * | 9/1995 | Itoh | ............... | 318/788 |
| 6,930,464 B2 * | 8/2005 | Han et al. | ...................... | 318/781 |
| 7,071,650 B2 * | 7/2006 | Ilda | ............... | 318/785 |
| 7,196,490 B2 * | 3/2007 | Kim et al. | ...................... | 318/751 |
| 7,239,109 B2 * | 7/2007 | Park et al. | ...................... | 318/789 |

FOREIGN PATENT DOCUMENTS

| | | |
|---|---|---|
| KR | 10-2006-0016835 | 2/2006 |
| KR | 10-0823920 | 4/2008 |

* cited by examiner

*Primary Examiner* — Walter Benson
*Assistant Examiner* — Thai Dinh
(74) *Attorney, Agent, or Firm* — McKenna Long & Aldridge LLP

(57) ABSTRACT

The present invention relates to a single phase induction motor, and more particularly, to a single phase induction motor, wherein a variable resistance element which can change a winding number of a main winding or an auxiliary winding capable of producing a magnetic field at the time of starting is connected in parallel to some portion of the main winding or the auxiliary winding. A single phase induction motor including a stator composed of a core, a main winding and an auxiliary winding, and a rotor rotated by a mutual electromagnetic force by the stator comprises a resistance variable element connected in parallel to some portion of the main winding. In addition, a single phase induction motor including a stator composed of a core, a main winding and an auxiliary winding, and a rotor rotated by a mutual electromagnetic force by the stator comprises a capacitor connected in series to the auxiliary winding, and a resistance variable element connected in parallel to some portion of the auxiliary winding and the capacitor.

7 Claims, 5 Drawing Sheets

SINGLE PHASE INDUCTION MOTOR

This application is a 35 U.S.C. § 371 National Stage entry of International Application No. PCT/KR2009/003081, filed on Jun. 9, 2009, and claims priority to Korean Application No. KR 10-2008-0117107, filed on Nov. 24, 2008, both of which are hereby incorporated by reference in their entireties.

TECHNICAL FIELD

The present invention relates to a single phase induction motor, and more particularly, to a single phase induction motor, wherein a variable resistance element which can change a winding number of a main winding or an auxiliary winding capable of producing a magnetic field at the time of starting is connected in parallel to some portion of the main winding or the auxiliary winding.

BACKGROUND ART

Generally, in a single phase induction motor, a main coil and a sub coil are wound in a stator at 90° in space, and a power voltage is applied to the main coil directly and to the sub coil through a capacitor and a switch. It is because a rotor is not started merely by the main coil, although a voltage is applied thereto. Therefore, a rotor field is produced in the stator through a starting device such as the sub coil to get the rotor started.

The starting devices are classified into a split phase type, a shading coil type, a capacitor start type and a repulsion start type according to kinds.

Figure 1:
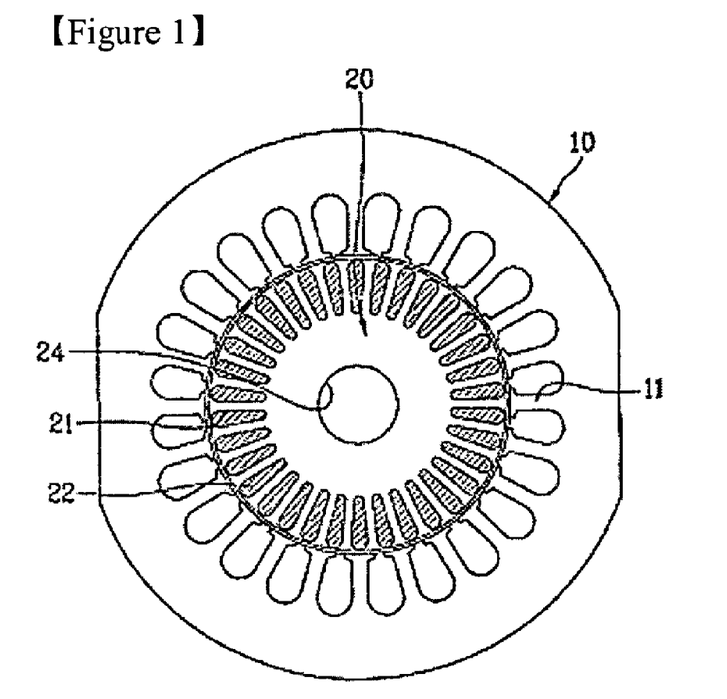
FIG. 1 is a view illustrating a stator and a rotor of a general single phase induction motor.
Figure 2:
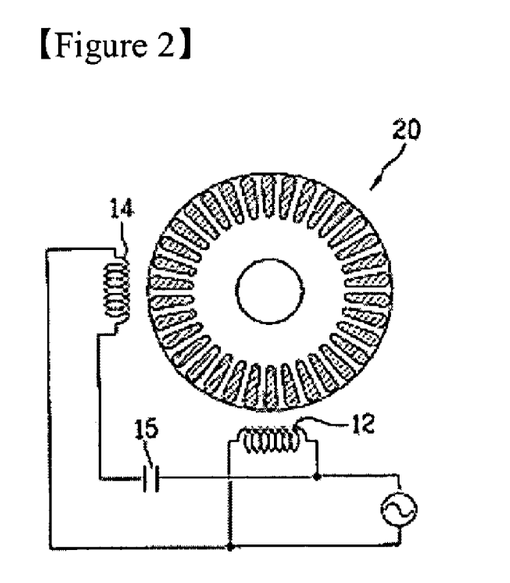
FIG. 2 is a schematic circuit view illustrating the rotor and stator coils.

As one example of the single phase induction motor having the starting device, a capacitor start type single phase induction motor is illustrated in FIGS. 1 and 2.

FIG. 1 illustrates a stator and a rotor of a normal single phase induction motor, and FIG. 2 illustrates a simplified circuit of the rotor and stator coils.

When only a main coil 12 is wound in a stator 10, only an alternating magnetic field is produced in the stator 10, so that a rotor 20 is not started. Accordingly, a sub coil 14 is wound in the stator 10 to produce a rotating magnetic field, such that the rotor 20 is started and rotated in a certain direction by the rotating magnetic field. That is, a starting torque is generated via the rotating magnetic field.

Here, a capacitor 15 delays a phase of a current applied to the sub coil 14 to generate the starting torque through mutual operation with the main coil 12. Although power is not applied to the sub coil 14, the rotor 20 continues to rotate once started, as far as there is no change in load. Therefore, it is not necessary to apply power to the sub coil 14 over a certain revolution number after starting. However, if the load is variable, since the starting torque is necessary, it is preferable to supply power to the sub coil 14 through the capacitor 15 all the time.

In the case of a three phase induction motor, although only a main coil is wound in a stator, a rotating field is produced, so that it is not necessary to wind a sub coil in the stator. That is, the three phase induction motor does not need a special starting device.

The single phase induction motor has superior price competitiveness because it does not require an inverter construction unlike a Brushless DC (BLDC) motor or a reluctance motor and can be started by single phase commercial power.

The normal single phase induction motor will be explained in detail with reference to FIGS. 1 and 2.

The stator 10 has a hollow structure, and consists of a plurality of teeth 11 placed along an inner circumference at intervals of a certain angle to protrude to an inner radius direction, and the main coil 12 wound on the respective teeth 11 to have N or S polarity in primary current application.

Here, an insulator (not shown) is provided between the teeth 11 and the main coil 12 to perform an insulation function between the teeth 11 and the main coil 12 as well as a function of causing the main coil 12 to be easily wound.

In addition, the stator 10 includes the sub coil 14 wound at a certain angle in space from the main coil 12 to produce a rotating magnetic field as the current is applied. The sub coil 14 is also wound on the teeth 11 through the insulator. The main coil 12 and the sub coil 14 can be referred to as a stator coil or a coil. The coils 12 and 14 are connected to a single phase power supply, and the main coil 12 and the sub coil 14 are connected in parallel to each other. Moreover, the capacitor 15 is connected in series to the sub coil 14. Further, although not illustrated, the capacitor 15 may be selectively connected to the power supply through a switch.

The rotor 20 is normally a squirrel cage rotor. FIGS. 1 and 2 illustrate the squirrel cage rotor.

The rotor 20 is formed by stacking steel plates in which a plurality of slots 21 are formed at certain angles along the outer circumference in a certain radius position from the center. Also, the rotor 20 includes bar-shaped conductors 22 inserted into the slots 21 of a rotor core. The bar-shaped conductors 22 are normally formed of Cu or Al bars.

In addition, both ends of the squirrel cage rotor core are connected by end rings (not shown) to form electric short through the bar-shaped conductors 22. Generally, they are die-casted. That is, the bar-shaped conductors 22 and the end rings are integrally formed by Al diecasting, and the end rings are formed at upper and lower parts of the rotor core respectively.

Meanwhile, an axial hole 24 is formed in a central portion of the rotor 20. A rotation shaft (not shown) which transfers a rotation force of the rotor 20 to the outside is press-fit into the axial hole 24, and rotated integrally with the rotor 20.

In the single phase induction motor so constructed, when power is applied to the coils 12 and 14, an induced current is produced in the bar-shaped conductors 22, so that the rotor 20 is rotated by an induced torque generated thereby.

DISCLOSURE

Technical Problem

An object of the present invention is to provide a single phase induction motor which can improve a starting torque by increasing a size of a current flowing through a main winding or an auxiliary winding at the time of starting.

Another object of the present invention is to provide a single phase induction motor which can improve a starting torque at the time of starting without reducing a stalling torque in a normal operation, by connecting a variable resistance element with a variable resistance size in parallel to some portion of a main winding or an auxiliary winding.

A further object of the present invention is to provide a single phase induction motor which can reduce a resistance of a main winding or an auxiliary winding and a leakage reactance value at the time of starting, by using a Positive Temperature Coefficient (PTC) element or an Electrical-Positive Temperature Coefficient (E-PTC) element as a variable resistance element.

Technical Solution

According to the present invention, there is provided a single phase induction motor including a stator composed of a core, a main winding and an auxiliary winding, and a rotor rotated by a mutual electromagnetic force by the stator, the single phase induction motor comprising a resistance variable element connected in parallel to some portion of the main winding.

According to another aspect of the present invention, the other portion of the main winding is electrically connected in series to some portion of the main winding and the resistance variable element.

According to a further aspect of the present invention, the resistance variable element is a PTC element.

According to a still further aspect of the present invention, the resistance variable element is an E-PTC element.

According to a still further aspect of the present invention, the resistance variable element has a low resistance at the time of starting, and has a resistance high enough to intercept a current flowing to the resistance variable element in a normal operation.

According to a still further aspect of the present invention, the main winding is formed by winding a plurality of coils connected in parallel to each other around the stator core, and the resistance variable element is connected in parallel to one of the plurality of coils.

In addition, according to the present invention, there is provided a single phase induction motor including a stator composed of a core, a main winding and an auxiliary winding, and a rotor rotated by a mutual electromagnetic force by the stator, the single phase induction motor comprising a capacitor connected in series to the auxiliary winding, and a resistance variable element connected in parallel to some portion of the auxiliary winding and the capacitor.

Moreover, according to the present invention, there is provided a single phase induction motor including a stator composed of a core, a main winding and an auxiliary winding, and a rotor rotated by a mutual electromagnetic force by the stator, the single phase induction motor comprising a resistance variable element connected in series to the auxiliary winding, and a capacitor connected in parallel to some portion of the auxiliary winding and the resistance variable element.

According to another aspect of the present invention, the resistance variable element is a PTC element.

According to a further aspect of the present invention, the resistance variable element is an E-PTC element.

According to a still further aspect of the present invention, the resistance variable element has a low resistance at the time of starting, and has a resistance high enough to intercept a current flowing to the resistance variable element in a normal operation.

According to a still further aspect of the present invention, the single phase induction motor further comprises a supplementary resistance variable element connected in parallel to some portion of the main winding.

According to a still further aspect of the present invention, the supplementary resistance variable element is an E-PTC element.

Advantageous Effects

According to the present invention, since the single phase induction motor can change a size of a current flowing through the main winding in the starting operation and the normal operation, even a single phase induction motor with a large stalling torque can improve a starting torque without reducing efficiency.

In addition, according to the present invention, since the single phase induction motor can change a size of a current flowing through the auxiliary winding in the starting operation and the normal operation, it can improve a starting torque.

MODE FOR INVENTION

Figure 3:
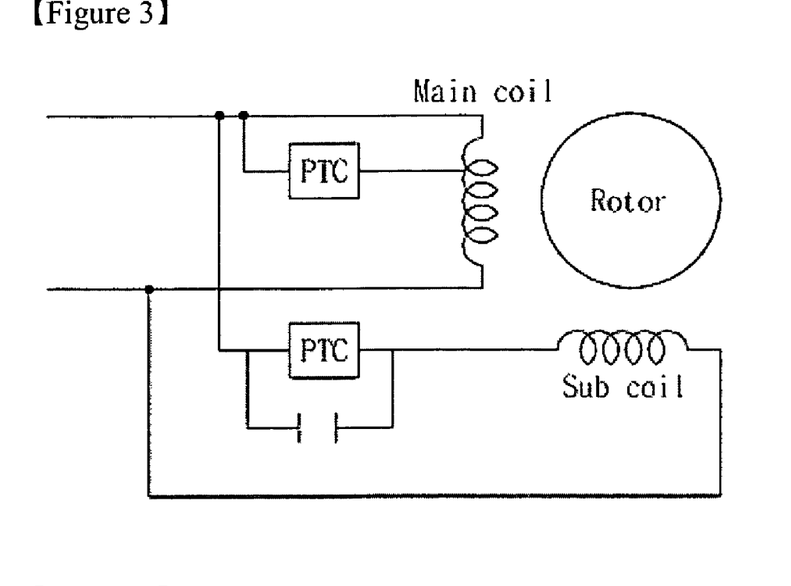
FIG. 3 is a schematic circuit view illustrating a single phase induction motor according to a first embodiment of the present invention.

FIG. 3 is a schematic circuit view illustrating a single phase induction motor according to a first embodiment of the present invention. The single phase induction motor according to the first embodiment of the present invention includes a stator applied with single phase alternating current power, and a rotor having bar-shaped conductors inserted thereinto and being rotated by a mutual electromagnetic force by the stator. In the stator, a main winding and an auxiliary winding are wound around a stator core at an interval of 90° in space. Although the single phase alternating current power is applied to the main winding and the auxiliary winding, since a balanced magnetic field forming an angle of 90° with a variable size is produced, the rotor cannot be rotated. Therefore, an element which shifts a phase of a current flowing through the auxiliary winding should be connected to the auxiliary winding. The single phase induction motor of the present invention is a condenser start type single phase induction motor using a capacitor (condenser) for starting. The condenser start type single phase induction motor has better efficiency and power factor than other single phase induction motors, reduces vibration and noise since it produces an almost circular rotating magnetic field, and shows a satisfactory operating state. In the condenser start type single phase induction motor, since the capacitor and the auxiliary winding are connected such that a current having a faster phase than a voltage flows through the auxiliary winding, the main winding and the auxiliary winding have a phase difference of about 90°. A starting torque of the condenser start type single phase induction motor is influenced by a size of a current flowing through the main winding, a size of a current flowing through the auxiliary winding, a phase difference between currents flowing through the main winding and the auxiliary winding, an effective winding ratio of the main winding and the auxiliary winding, and so on. If the main winding is wound more to improve efficiency of the single phase induction motor or a torque (stalling torque) in a normal operation, since the effective winding ratio of the motor is reduced and the starting torque of the motor is severely reduced, the starting is difficult due to the small starting torque. On the contrary, if the main winding is wound less, efficiency of the single phase induction motor or the stalling torque is deteriorated.

In order to ensure the starting torque and the stalling torque in the single phase induction motor of the present invention, as illustrated in FIG. 3, a tap is formed in a main winding circuit and a variable resistance element is connected thereto in parallel. Preferably, the variable resistance element is a PTC element. As a current flows, a temperature of the PTC element rises and a resistance increases infinitely, which makes the circuit almost open. Accordingly, when the PTC element is used as the variable resistance element, a special control unit for controlling the variable resistance element is not necessary. After a certain time elapses, the circuit with the PTC circuit connected thereto is open.

Therefore, in the single phase induction motor according to the first embodiment of the present invention, some portion of the main winding and the PTC element are connected in parallel at the time of starting, and the PTC element, some portion of the main winding connected in parallel to the PTC element, and the other portion of the main winding are connected in series to one another. Meanwhile, an inductance decreases in the PTC element and some portion of the main winding connected in parallel to the PTC element.

In the meantime, when a coil (main coil) of the main winding is wound around teeth of the stator core, two or more strands of coils can be wound at a time to simplify a winding process. It is desirable to wind a thick coil a lot in terms of a strong torque. But, since there are problems in size, it is impossible to wind the thick coil a lot. That is, if a coil is thick, it should be wound less. A thin coil can be wound more. The thick coil has an advantage in that it can apply a large current at a time, which strengthens a magnetic force on the rotor side, raises a repulsive force against a permanent magnet, and increases a torque and a revolution number. However, since it is difficult to bend the thick coil due to its hardness, it is impossible to wind the coil densely. As a result, a magnetic flux density is reduced and a magnetic force is weakened. Here, suggested is a multiwind using several strands of coils. The more the number of the strands increases, the more the thickness of the coil decreases. Accordingly, the winding number of the coil increases, so that the magnetic flux density increases.

It is easier to configure a circuit with a PTC element connected thereto when the main winding is formed of a plurality of main coils than when the main winding is formed of one coil. That is, it is easier to connect the PTC element to an end of at least one coil than to form a tap in the middle of the wound coil and connect the PTC element thereto. The plurality of wound main coils have an almost same coil characteristic as that of one thick wound main coil. When the PTC element is connected in parallel to one or more of the plurality of main coils, an inductance of the main coil to which the PTC element is connected is reduced. Thereafter, when a temperature of the PTC element rises and a current flowing to the PTC element is intercepted, the main coil to which the PTC element is connected in parallel almost recovers its original inductance.

Figure 4:
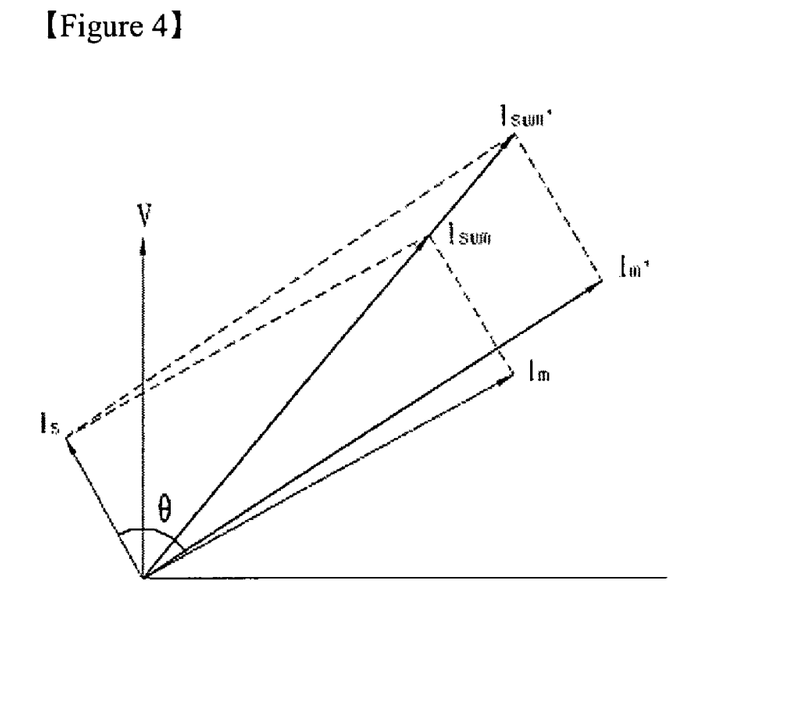
FIG. 4 is a graph showing inductance vectors generated in a main winding and an auxiliary winding of a stator according to the first embodiment of the present invention.

FIG. 4 is a graph showing inductance vectors generated in the main winding and the auxiliary winding of the stator according to the first embodiment of the present invention. The main winding and the auxiliary winding are of the same size and winding number. When the PTC element is connected in parallel to some portion of the main winding at the time of starting, the single phase induction motor according to the first embodiment has effects as if the winding number of the main winding is smaller than that of the conventional single phase induction motor and an inductance Lm is smaller than an inductance Lm' of the conventional main winding at the time of starting. Meanwhile, when the inductance of the main winding decreases, the value of the current flowing through the main winding increases, so that the starting torque of the single phase induction motor increases.

Figure 5:
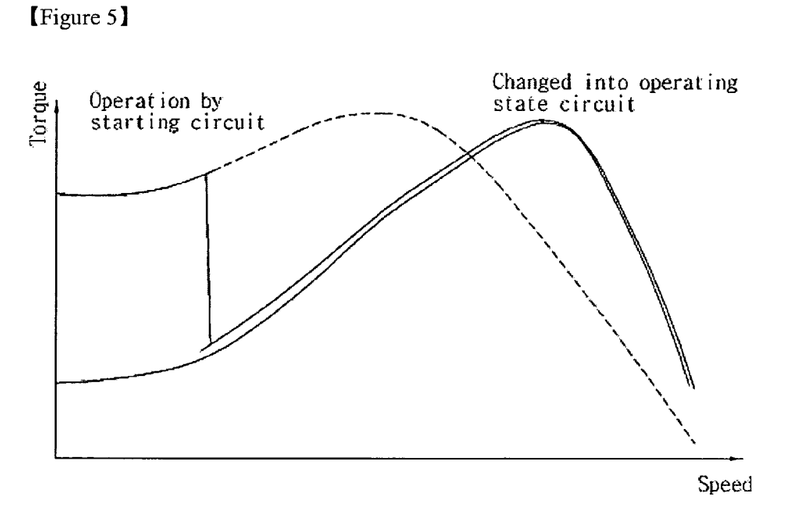
FIG. 5 is a graph showing changes of a torque by changes of a stator circuit according to the first embodiment of the present invention.

FIG. 5 is a graph showing changes of the torque by changes of the stator circuit according to the first embodiment of the present invention. When the current flows continuously, the temperature of the PTC element rises continuously, and the resistance of the PTC element rises almost infinitely. Therefore, the circuit becomes an open state circuit where the current seldom flows through the PTC element connected in parallel to some portion of the main winding. Accordingly, the current flows the almost overall main winding, and the inductance is the same as the conventional one. That is, after a certain time, a starting circuit where the PTC element is connected in parallel to some portion of the main winding such that only the other portion of the main winding produces a rotating alternating magnetic field is changed into an operating state circuit where the overall main winding produces a rotating alternating magnetic field. According to a result of observing changes of a starting torque in a single phase induction motor having 0.38 Nm of starting torque, changing a winding number of a main winding, when the winding number of the main winding was reduced by about 10%, the starting torque was about 0.40 Nm, which was increased by about 5%.

Figure 6:
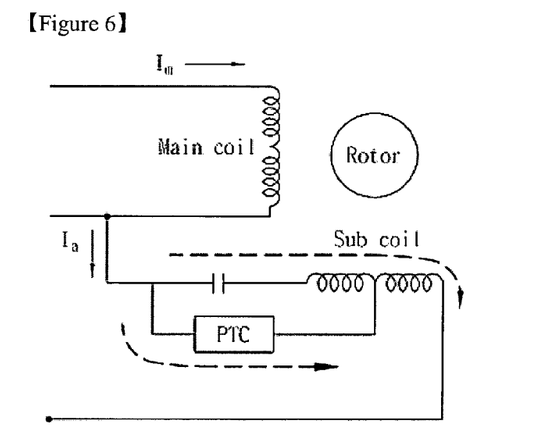
FIGS. 6 and 7 are schematic views illustrating stator circuits according to second and third embodiments of the present invention.
Figure 7:
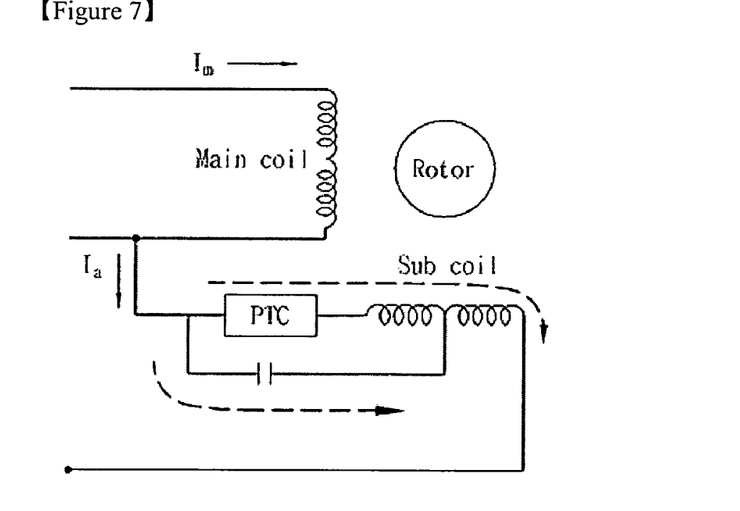

FIGS. 6 and 7 are schematic views illustrating stator circuits according to second and third embodiments of the present invention. In the stator circuits according to the second and third embodiments of the present invention, an auxiliary winding and a capacitor are connected in series, a tap is formed in the auxiliary winding, and a variable resistance element is connected in parallel to the auxiliary winding and the capacitor (second embodiment), or an auxiliary winding and a variable resistance element are connected in series, a tap is formed in the auxiliary winding, and a capacitor is connected in parallel to the auxiliary winding and the variable resistance element (third embodiment). In the same manner, when the tap is formed in the auxiliary winding and the variable resistance element is connected thereto, the effect is the same as when the winding number of the auxiliary winding is reduced at the time of starting when the current flows through the resistance. Therefore, at the time of starting, an inductance of the auxiliary winding decreases and a current flowing through the auxiliary winding increases.

$Z_{Ta} = Z_{1a} + Z_c + a^2(Z_f + Z_b)$:Auxiliary winding impedance $Z_T = Z_1 + Z_f + Z_b$:Main winding impedance $$I_m = \frac{V_m Z_{Ta} + jV_a a(Z_f - Z_b)}{Z_T Z_{Ta} - a^2(Z_f - Z_b)^2}$$

$$I_a = \frac{V_a Z_T - jV_m a(Z_f - Z_b)}{Z_T Z_{Ta} - a^2(Z_f - Z_b)^2}$$

$$T = [I_m^2 + (aI_a)^2](R_f - R_b) + (2aI_m I_a \sin\phi)(R_f + R_b)$$

At the time of starting, since $Z_f = Z_b$, $$T_{st} = (2aI_m I_a \sin\phi)(2R_f)$$

$$I_m = \frac{V_m}{Z_T} \quad I_a = \frac{V_a}{Z_{Ta}}$$

$$Z_{Ta} = Z_{1a} + a^2 2Z_f, \quad Z_T = Z_1 + 2Z_f$$

$$T_{st} = \left(4R_f \frac{V^2}{|Z_T||Z_{Ta}/a|} \sin\phi\right)(2R_f)$$

$$Z_T = Z_1 + 2Z_f$$
$$= r_1 + jX_1 + 2(R_f + jX_f)$$

$$Z_{Ta}/a = Z_{Ta}/a + 2aZ_f$$
$$= r_{1a} \times N/a + jX_{1a} \times N^2/a + 2a(R_f + jX_f) + r_{ptc}/a$$

Figure 8:
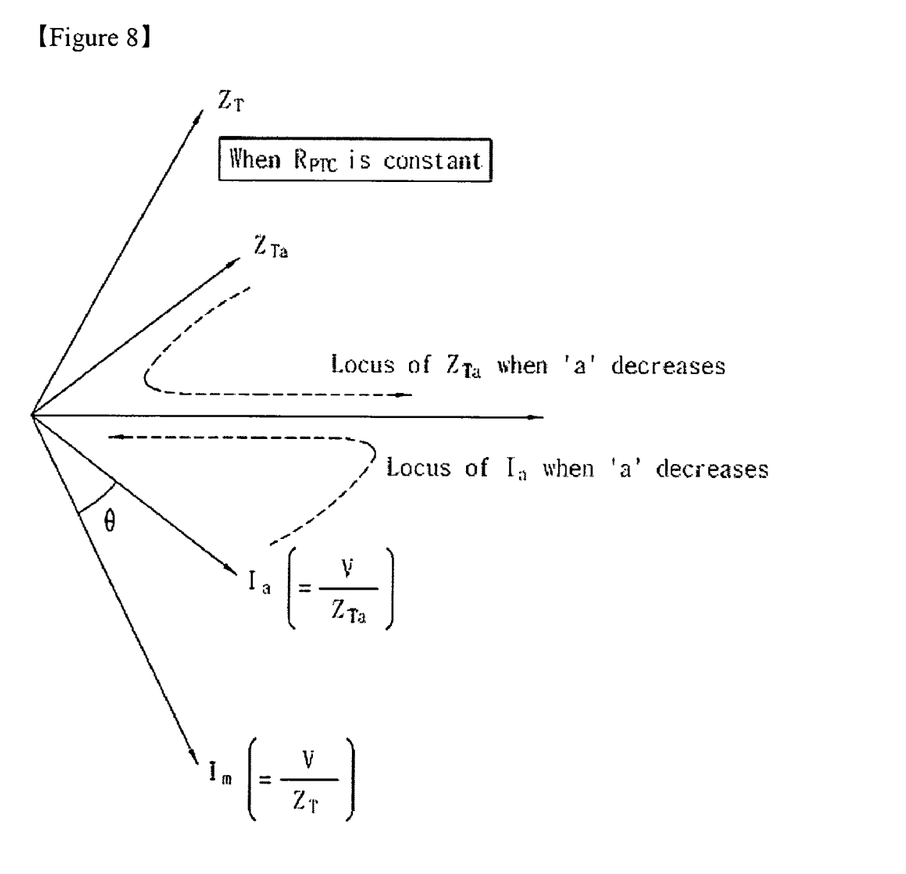
FIG. 8 is a graph showing changes of an impedance of an auxiliary winding and a current flowing through the auxiliary winding by changes of a winding number of the auxiliary winding.

Referring to the above formulae and FIG. 8, when 'a' decreases (i.e. when the winding number of the auxiliary winding decreases), since a current $I_a$ flowing through the auxiliary winding increases for a certain period and a phase difference increases, it is known from the following formula that a starting torque $T_{st}$ increases.

$$T_{st} = \left(4R_f \frac{V^2}{|Z_T||Z_{Ta}/a|} \sin\phi\right)(2R_f)$$

After an optimum point where the starting torque is the largest, the phase difference between the main winding and the auxiliary winding approximates to 90°. However, since a size of $|I_a|$ decreases, $T_{st}$ decreases.

Figure 9:
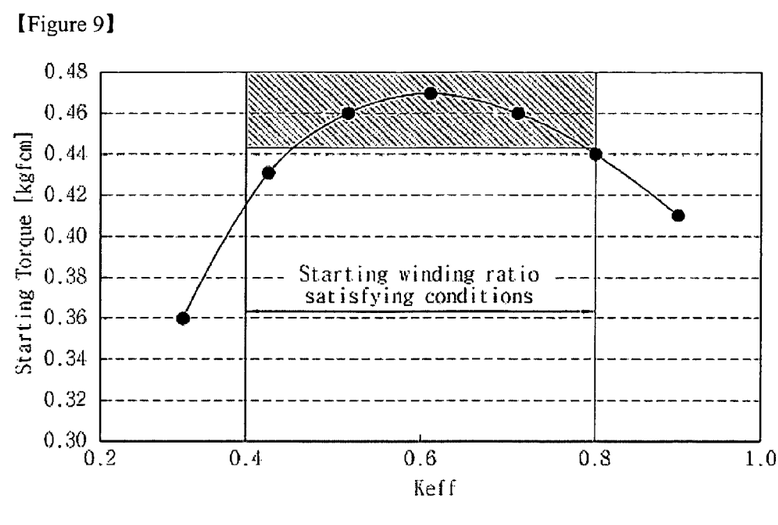
FIG. 9 is a graph showing changes of a starting torque by changes of the winding number of the auxiliary winding.

FIG. 9 is a graph showing changes of the starting torque by changes of the winding number of the auxiliary winding. In order to find out whether the above formulae were actually applicable to the single phase induction motor, changes of the starting torque were observed, changing the winding number of the auxiliary winding in a single phase induction motor model. A PTC element had 4.8Ω, and the single phase induction motor model was a single phase induction motor for a reciprocating compressor having a starting torque of 0.38 Nm.

TABLE 1

| Model | Winding | Starting Torque |
|---|---|---|
| Base Model | | 0.38 Nm |
| Aux. winding (Sub coil) | +10% | 0.34 Nm |
| | −10% | 0.41 Nm |
| | −20% | 0.45 Nm |
| | −30% | 0.46 Nm |
| | −40% | 0.47 Nm |
| | −50% | 0.46 Nm |
| | −60% | 0.43 Nm |
| | −70% | 0.36 Nm |
| | −50% | 0.54 Nm |

According to the above Table and FIG. 9, when the winding number of the auxiliary winding was smaller in a starting operation than in a normal operation by about 10 to 70%, the starting torque increased from 0.3 Nm to 0.9 Nm. That is, when Keff (the winding number of the auxiliary winding in starting/the winding number of the auxiliary winding in operation) was between 0.35 and 0.9, the starting torque was improved, and particularly, when Keff was between 0.4 and 0.8, the starting torque was improved over 0.6 Nm.

Meanwhile, the main winding and the auxiliary winding may include a variable resistance element connected in parallel to some portion thereof, respectively. However, the PTC element used as the variable resistance element brings continuous power loss of about 2 W during the normal operation, even though it is very small. Here, if an E-PTC element is used as the variable resistance element, since a current flowing to the E-PTC element is completely intercepted after a certain time, the E-PTC element does not cause power loss.

In the meantime, when the winding number of the main winding decreases, the starting torque always increases. The auxiliary winding may be changed according to the specification of the main winding. It is thus easier to install the PTC element in parallel to the main winding to control the starting torque. However, a current applied to the main winding decreases in the normal operation due to power loss caused by the PTC element, which is disadvantageous in terms of efficiency of the single phase induction motor. In this situation, the single phase induction motor can employ the E-PTC element to improve the starting torque in the normal operation without reducing efficiency. However, considering that the E-PTC element is much more expensive than the PTC element, it is better to install the PTC element in the auxiliary winding circuit to control the starting torque. Since an optimum resistance size of the PTC element installed in the auxiliary winding circuit and a position of a tap formed in the auxiliary winding for installation of the PTC element are changed according to changes of the specification of the main winding, installing the PTC element in parallel to the auxiliary winding is more complicated in a designing phase. Nevertheless, installing the PTC element on the auxiliary winding seldom affects efficiency of the single phase induction motor in the normal operation, and is advantageous in terms of costs.

The invention claimed is:

1. A single phase induction motor including a stator composed of a core, a main winding and an auxiliary winding, and a rotor rotated by a mutual electromagnetic force by the stator, the single phase induction motor comprising:
    a capacitor connected in series to the auxiliary winding; and
    a resistance variable element connected in parallel to a portion of the auxiliary winding and the capacitor, wherein a ratio of a winding number of the auxiliary winding used in a starting operation to a winding number of the auxiliary winding used in a normal operation ranges from 0.35 to 0.9.

2. The single phase induction motor of claim 1, wherein the supplementary resistance variable element is an electrical-positive temperature coefficient element.

3. A single phase induction motor including a stator composed of a core, a main winding and an auxiliary winding, and a rotor rotated by a mutual electromagnetic force by the stator, the single phase induction motor comprising:
    a resistance variable element connected in series to the auxiliary winding; and
    a capacitor element connected in parallel to a portion of the auxiliary winding and the resistance variable element, wherein a portion of the auxiliary winding connected in parallel to another element is equivalent to 10 to 65% of a total winding number of the auxiliary winding.

4. The single phase induction motor of either claim 1 or 3, wherein the resistance variable element is a positive temperature coefficient element.

5. The single phase induction motor of either claim 1 or 3, wherein the resistance variable element is an electrical-positive temperature coefficient element.

6. The single phase induction motor of either claim 1 or 3, wherein the resistance variable element has a low resistance at the time of starting, and has a resistance high enough to intercept a current flowing to the resistance variable element in a normal operation.

7. The single phase induction motor of either claim 1 or 3, further comprising a supplementary resistance variable element connected in parallel to a portion of the main winding.

* * * * *